United States Patent [19]
Herbst et al.

[11] Patent Number: 4,888,103
[45] Date of Patent: Dec. 19, 1989

[54] PROCESS OF STRIPPING IN A CATALYTIC CRACKING OPERATION EMPLOYING A CATALYST MIXTURE WHICH INCLUDES A SHAPE SELECTIVE MEDIUM PORE SILICATE ZEOLITE COMPONENT

[76] Inventors: Joseph A. Herbst, 60 Bryant Rd., Turnersville, N.J. 08012; Hartley Owen, 5 Riverview Ter., Belle Mead, N.J. 00502; Paul H. Schipper, 2506 Berwyn Rd., Wilmington, Del. 19810

[21] Appl. No.: 903,365

[22] Filed: Sep. 3, 1986

[51] Int. Cl.⁴ .............................................. C10G 11/05
[52] U.S. Cl. ......................................... 208/73; 208/74; 208/75; 208/113
[58] Field of Search ............. 208/153, 157, 73, 74–78, 208/144, 145, 111, 120, 113; 422/140, 144

[56] References Cited
U.S. PATENT DOCUMENTS

| | | |
|---|---|---|
| 3,617,497 | 11/1971 | Bryson et al. |
| 3,748,251 | 7/1973 | Demmel et al. |
| 3,849,291 | 11/1974 | Owen |
| 3,894,931 | 7/1975 | Nace et al. |
| 3,894,932 | 7/1975 | Owen |
| 3,894,933 | 7/1975 | Owen et al. |
| 3,894,934 | 7/1975 | Owen et al. |
| 3,894,935 | 7/1975 | Owen |
| 3,926,778 | 12/1975 | Owen et al. |
| 3,928,172 | 12/1975 | Davis, Jr. et al. |
| 3,974,062 | 8/1976 | Owen et al. |
| 4,116,814 | 9/1978 | Zahner |
| 4,259,175 | 3/1981 | McArthur |
| 4,287,088 | 9/1981 | Sirkar |
| 4,309,279 | 1/1982 | Chester et al. |
| 4,368,114 | 1/1983 | Chester et al. |
| 4,422,925 | 12/1983 | Williams ............................ 208/75 |
| 4,490,241 | 12/1984 | Chou ................................. 208/75 |

Primary Examiner—Glenn Caldarola
Attorney, Agent, or Firm—A. J. McKillop; C. J. Speciale; R. D. Stone

[57] ABSTRACT

An improved process for stripping, or desorbing, entrained hydrocarbon material and, where present, sulfur-containing material, from a catalyst mixture recovered from a catalytic cracking reaction zone is described which comprises:

(a) providing a quantity of catalyst mixture containing entrained hydrocarbon material and, optionally, sulfur-containing material, in at least one stripping zone in which a stripping gas removes said entrained hydrocarbon material and, where present, sulfur-containing material, the catalyst mixture comprising, as a first catalyst component, an amorphous and/or large pore crystalline cracking catalyst and, as a second catalyst component, a shape selective medium pore crystalline silicate zeolite catalyst, said first and second catalyst components being present in admixture within a common stripping zone or segregated into separate stripping zones; and, (b) conducting an exothermic reaction within the common stripping zone or within the separate stripping zone containing segregated second catalyst component, the heat released by the exothermic reaction providing an increase in the temperature of the catalyst in the stripping zone which results in the removal of a greater quantity of entrained hydrocarbon material and, where present, sulfur-containing material, than that occurring in the absence of such exothermic reaction.

20 Claims, 3 Drawing Sheets

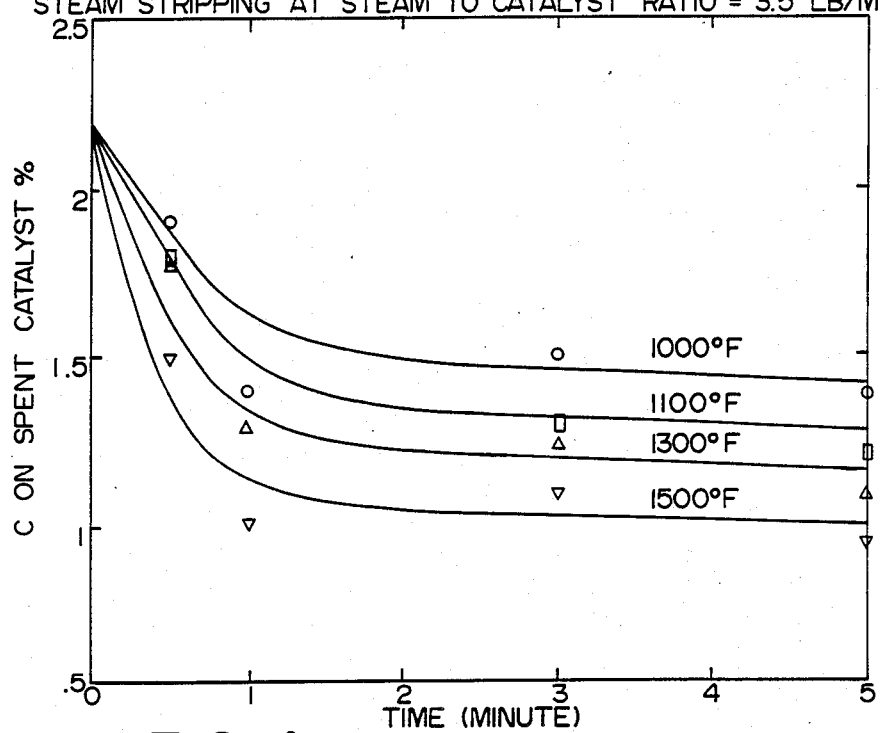
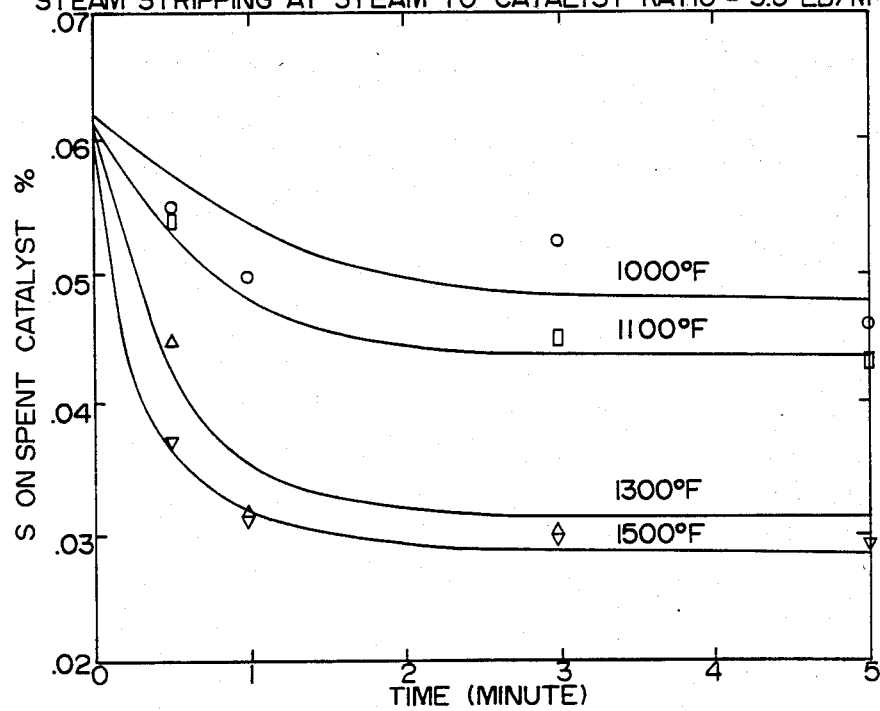

PROCESS OF STRIPPING IN A CATALYTIC CRACKING OPERATION EMPLOYING A CATALYST MIXTURE WHICH INCLUDES A SHAPE SELECTIVE MEDIUM PORE SILICATE ZEOLITE COMPONENT

BACKGROUND OF THE INVENTION

This invention relates to a catalytic cracking process and apparatus and, more particularly, to the stripping operation thereof.

In known and conventional fluidized catalytic cracking processes, a relatively heavy hydrocarbon feedstock, e.g., a gas oil, admixed with a suitable cracking catalyst, e.g., a large pore crystalline silicate zeolite such as zeolite Y, to provide a fluidized suspension is cracked in an elongated reactor, or rise, at elevated temperature to provide a mixture of lighter hydrocarbon products. The gasiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidized catalyst is continuously circulated between the riser and the regenerator and serves to transfer heat from the latter to the former thereby supplying the thermal needs of the cracking reaction which is endothermic.

Particular examples of such catalytic cracking processes are disclosed in U.S. Pat. Nos. 3,617,497, 3,894,932, 4,309,279 and 4,368,114 (single risers) and U.S. Pat. Nos. 3,748,251, 3,849,291, 3,894,931, 3,894,933, 3,894,934, 3,894,935, 3,926,778, 3,928,172, 3,974,062 and 4,116,814 (multiple risers).

Several of these processes employ a mixed catalyst system with each component of the system possessing different catalytic properties and functions. For example, in the dual riser hydrocarbon conversion process described in U.S. Pat. No. 3,894,934, a heavy hydrocarbon first feed, e.g., a gas oil, is cracked principally as a result of contact with a large pore crystalline silicate zeolite cracking catalyst, e.g., zeolite Y, to provide lighter products. Spent catalyst is separated from the product stream and enters the dense fluid catalyst bed in the lower section of the stripping vessel. A $C_3$-rich second feed, meanwhile, undergoes conversion to cyclic and/or alkylaromatic hydrocarbons in a second riser, principally as a result of contact with a shape selective medium pore crystalline silicate zeolite, e.g., zeolite ZSM-5. Spent catalyst recovered from the product stream of the second riser similarly enters the dense catalyst bed within the stripping vessel. U.S. Pat. No. 3,894,934 also features the optional introduction of a $C_3$-containing hydrocarbon third feed along with an aromatic-rich charge into the dense fluid bed of spent catalyst above the level of introduction of the stripping gas to promote the formation of alkyl aromatic therein. As desired, the third feed may be light gases obtained from a fluid cracking light ends recovery unit, virgin straight run naptha, catalytically cracked naphtha, thermal naphtha, natural gas constituents, natural gasoline, reformates, a gas oil, or a residual oil of high coke-producing characteristics.

The problem of $SO_x$ (sulfur oxides) emissions in the components of flue gas discharged from the regenerator zone of a catalytic cracking unit has been the subject of some investigation. U.S. Pat. No. 4,259,175 describes a process for preventing or reducing such $SO_x$ emissions by introducing into the catalytic cracking cycle an organic aluminum-containing compound such as aluminum isopropoxide in such a manner that the aluminum compound (or aluminum "sulfur getter") becomes dispersed and maintained relatively uniformly upon the surfaces of the catalyst particles. The resulting dispersion is said to leave the activity of the catalyst particles unaffected but to alternately remove $SO_x$ compounds produced in the regeneration zone and release the $SO_x$ compounds so removed in the form of $H_2S$ during passage through the hydrocarbon conversion and stripping zones, thereby reactivating said dispersion for removing more $SO_x$ compounds in the regeneration zone.

SUMMARY OF THE INVENTION

It is an object of the present invention to provide a catalytic cracking operation employing a catalyst mixture which includes a shape selective medium pore crystalline silicate zeolite component with improved stripping of the catalyst mixture.

It is a particular object of the present invention to carry out stripping upon such a catalyst mixture at a significantly higher temperature to provide an appreciable increase in desorbed hydrocarbon material and where present, sulfur-containing material.

In keeping with these and other objects of the invention, there is provided an improved process for stripping, or desorbing, entrained hydrocarbon material and where present, sulfur-containing material, from a catalyst mixture recovered from a catalytic cracking reaction zone which comprises:

(a) providing a quantity of catalyst mixture containing entrained hydrocarbon material and, optionally, sulfur-containing material, in at least one stripping zone in which a stripping gas removes said entrained hydrocarbon material and, where present, sulfur-containing material, the catalyst mixture comprising, as a first catalyst component, particles of an amorphous and/or large pore crystalline cracking catalyst and, as a second catalyst component, particles of a shape selective medium pore crystalline silicate zeolite catalyst, said particles of first and second catalyst component being present in admixture within a common stripping zone or segregated into separate stripping zones; and, (b) conducting an exothermic reaction within the common stripping zone or within the separate stripping zone containing segregated particles of second catalyst component, the heat released by the exothermic reaction providing an increase in the temperature of the catalyst in the stripping zone which results in the removal of a greater quantity of entrained hydrocarbon material and, where present, sulfur-containing material, than that occuring in the absence of such exothermic reaction.

The term "catalyst" as used herein shall be understood to apply not only to a catalytically active material but to one which is composited with a suitable matrix component which may or may not itself be catalytically active.

By conducting an exothermic hydrocarbon conversion process which is catalyzed by the second catalyst component, i.e., the shape selective medium pore crystalline silicate zeolite component of the catalyst mixture, the temperature of the surrounding catalyst can be increased significantly, e.g., by 50° F. or more, with the result that the effectiveness of the stripping operation is improved to an appreciable extent. The increased efficiency of the stripping operation results in the recovery of additional hydrocarbon product which would otherwise be lost when the spent catalyst undergoes regeneration.

Another advantage of the improved stripping procedure herein lies in the conversion of entrained sulfur-containing material to hydrogen sulfide. In known and conventional stripping procedures, much of the sulfur remains with the stripped catalyst and is converted to $SO_x$ in the catalyst regenerator. By reducing the amount of sulfur conveyed to the regenerator with spent catalyst, the amounts of $SO_x$ emitted from the regenerator can be significantly reduced.

DESCRIPTION OF THE PREFERRED EMBODIMENTS

Figure 1:
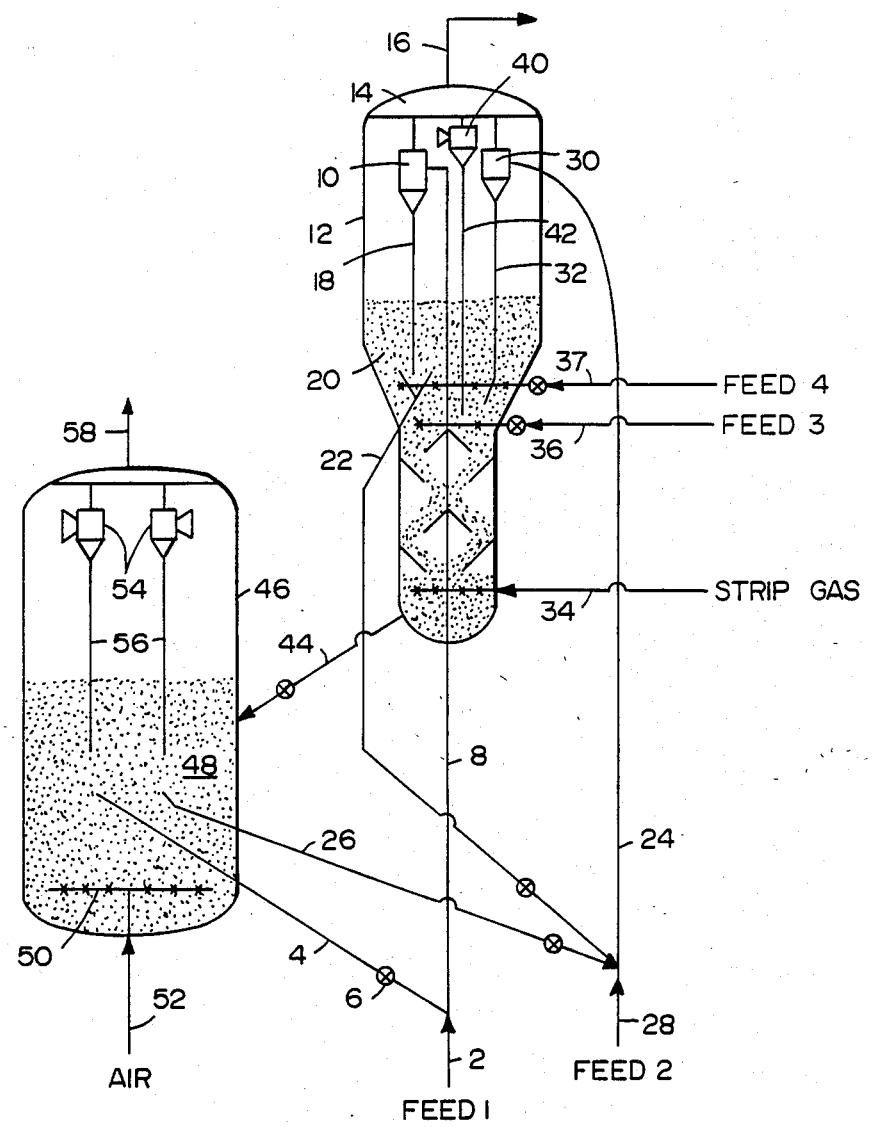
FIG. 1 illustrates the improved stripping process of this invention carried out upon a catalyst mixture present within a common stripping zone.

Although the improved catalyst stripping process of this invention will be more particularly described in connection with the dual riser fluidized catalytic cracking operation of U.S. Pat. No. 3,894,934, the contents of which are incorporated by reference herein, it can be practiced with any catalytic cracking procedure employing a mixed catalyst system which includes a shape selective medium pore crystalline silicate zeolite component.

Conventional cracking catalyst components are generally amorphous silica-alumina and crystalline silica-alumina. Other materials said to be useful as cracking catalysts are the crystalline silicoaluminophosphates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 Angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally occurring zeolites such as chabazite, faujasite, mordenite, and the like. Also useful are the silicon-substituted zeolites described in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline zeolite cracking catalysts as the first catalyst component of the mixed catalyst system. Preferred large pore crystalline silicate zeolite components of the mixed catalyst composition herein include such naturally occurring zeolites as mordenite and faujasite and such synthetic zeolites as zeolite X and Y with particular preference being accorded zeolites Y, REY, USY and RE-USY.

The shape selective medium pore crystalline silicate zeolite catalyst constituting the second catalyst component of the catalyst mixture herein is exemplified by ZSM-5, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Reissue Pat. No. 29,948 describing and claiming a crystalline material with an X-ray diffraction pattern of ZSM-5 is incorporated herein by reference as in U.S. Pat. No. 4,061,724 describing a high silica ZSM-5 referred to as "silicate" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,573, the entire contents of which are incorporated herein by reference.

The preferred shape selective crystalline silicate zeolite components of the mixed catalyst system herein are ZSM-5, ZSM-11, ZSM-12, ZSM-23, ZSM-35, ZSM-38 and ZSM-48 with ZSM-5 being particularly preferred.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, titanium and any other trivalent metal which is heavier than aluminum. Specific examples of such catalysts include ZSM-5 and zeolite Beta containing boron, gallium and/or titanium. In lieu of, or in addition to, being incorporated into the zeolite framework, these and other catalytically active elements can also be deposited upon the zeolite by any suitable procedure, e.g., impregnation.

The shape selective medium pore crystalline silicate zeolite catalyst can be present in the mixed catalyst system over widely varying levels. For example, the zeolite concentration can be present at a level as low as about 0.01 to about 1.0 weight percent of the total catalyst inventory (as in the case of the catalytic cracking process of U.S. Pat. No. 4,368,114) and can represent as much as 25 weight percent of the total catalyst system.

The catalytic cracking unit is preferably operated under fluidized flow conditions at a temperature within the range of from about 900° F. to about 1350° F., a first catalyst component to charge stock ratio of from about 2:1 to about 15:1 and a first catalyst component contact time of from about 0.5 to about 30 seconds. Suitable charge stocks for cracking comprise the hydrocarbons generally and, in particular, petroleum fractions having an initial boiling point range of at least 400° F., a 50% point range of at least 500° F. and an end point range of at least 600° F. Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking. The boiling temperature utilized herein are expressed in terms of convenience of the boiling point corrected to atmospheric pressure.

As indicated above, the improved stripping process of this invention can be carried out upon the catalyst mixture in which both catalyst components are more or less present in uniform admixture within a common stripping zone, an embodiment of which will be more fully described below in connection with the stripping process illustrated in FIG. 1.

Figure 2:
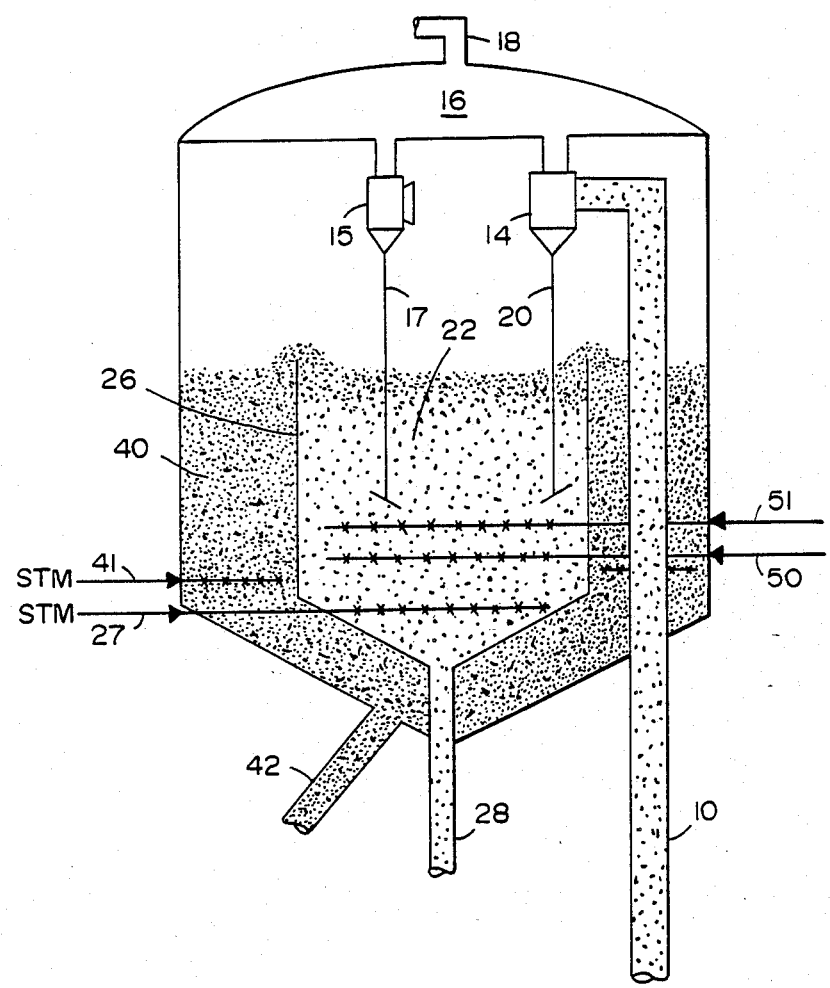
FIG. 2 illustrates the improved stripping process of this invention carried out upon ZSM-5 catalyst particles which are concentrated in a separate stripping zone; and, FIGS. 3 and 4 are graphical representations of data showing improved desorption of hydrocarbon material and sulfur-containing material, respectively, from spent catalyst with increased stripping temperature.

Alternatively, the first and second catalyst components can be separated, or segregated, into separate stripping zones with the exothermic reaction being carried out within the stripping zone containing the separated particles of second catalyst component. This embodiment of the invention which is illustrated in FIG. 2, infra, does much to overcome a major drawback of known and conventional catalystic cracking processes employing mixed catalyst systems in which both catalyst components circulate through the catalyst regeneration zone at about the same rate. As applied, for example, to a fluidized catalytic cracking process in which a cracking catalyst requiring frequent regeneration such as zeolite Y is employed in combination with a shape selective medium pore crystalline silicate zeolite catalyst requiring comparatively infrequent regeneration such as ZSM-5, the foregoing embodiment makes it possible to sustain the initial level of activity of the latter catalyst for much longer average periods than would otherwise be the case due to the reduced incidence of its exposure to the catalyst-degrading environment of the regenerator zone.

As shown in FIG. 1, a gas oil is introduced to the system by conduit 2 where it is combined with hot regenerated catalyst mixture comprising zeolite Y (first catalyst component) and ZSM-5 (second catalyst component) conveyed through conduit 4 equipped with flow control valve 6 to form a suspension of catalyst particles in oil vapors which pass upwardly through first riser reactor 8 maintained at an elevated temperature of about 1000° F. The catalyst mixture in first riser reactor 8 can comprise from about 0.1 to about 50 weight percent zeolite Y and from about 0.5 to about 25 weight percent ZSM-5. Riser 8 discharges directly into a cyclone separator 10 housed in the upper section of stripping vessel 12. Hot catalyst is separated from the hydrocarbon product of cracking in cyclone separator 10. Separated hydrocarbon vapors pass into plenum chamber 14 and are removed therefrom by conduit 16 for separation in downstream equipment (not shown). Catalyst separated in cyclone 10 is conveyed by dipleg 18 into a bed of catalyst 20 therebelow. In one arrangement it is contemplated passing hot catalyst separated from riser reactor 8 by conduit 22 substantially directly to the inlet of a second riser reactor 24. In yet another embodiment, only freshly regenerated catalyst is passed to the inlet of riser 24 as by conduit 26 or a mixture of catalyst obtained from conduits 22 and 26 may be introduced to riser 24. In any event, a $C_3$-rich stream is introduced by conduit 28 to second riser 24 for admixture with catalyst mixture introduced as above described to form a suspension. In second riser 24, a suspension of the catalyst mixture and $C_3$-containing feed is caused to be formed providing a mix temperature selected from within the range of from about 500° C. to about 1000° F. The catalyst-hydrocarbon suspension thus formed is caused to move through the riser under conditions including a space velocity selected from within the range of from about 0.1 up to about 150 thereby causing the formation of cyclic hydrocarbons and/or alkyl aromatic ring structures. Thus, riser 24 can be operated as a substantially more dense catalyst phase than first riser reactor 8 and therefore can be of a larger diameter than that relied upon for riser 8 in order to provide adequate contact time and more severe operating conditions within the desired operating constraints of the process. The zeolite Y cracking component can constitute from about 0.1 to about 50 weight percent of the catalyst mixture present in riser 24 while the ZSM-5 concentration can constitute from about 0.5 to about 25 weight percent of said catalyst mixture. It is contemplated providing for separate addition of either catalyst component to the catalyst mixture used in forming the suspension in riser 24. In any event, a suspension of the desired catalyst mixture and hydrocarbon vapors is formed and caused to move upwardly through riser 24 under preselected and desired temperature and space velocity conditions before discharge into a separator chamber or into a cyclone separator 30 with dipleg 32 provided within the upper section of stripping vessel 12. The reactions promoted in riser 24 can be effected at a temperature substantially equal to or below that employed in riser 8 and catalyzed essentially by the ZSM-5 component of the catalyst mixture with the zeolite Y component serving primarily as a heat sink. Catalyst discharged from diplegs 18 and 32 enters a fluid bed of catalyst particles 20 in the lower portion of stripping vessel 12. Fluid bed 20 moves generally downwardly through the vessel and through a common stripping zone provided in the lowermost section of vessel 12. Stripping gas, e.g., stream, nitrogen, light gas, etc., is introduced to the stripping zone through conduit 34. A third, ethylene-rich feed is introduced into catalyst bed 20 through line 36 at a level which is above the level of introduction of stripping gas passing through line 34. The ethylene-rich feed thereupon undergoes exothermic reaction to higher molecular weight products, the reaction being catalyzed by the ZSM-5 medium pore crystalline silicate zeolite present in the catalyst bed. The expression "ethylene-rich stream" contemplates feeds containing substantial quantities of ethylene, generally at least 10 weight percent, and more preferably at least 20 weight percent, of ethylene and includes essentially pure ethylene. The ethylene-rich stream can contain lesser quantities of one or more other light olefins, e.g., propylene, generally at levels which are less than about 50 weight percent and preferably less than about 30 weight percent, of the total olefin. A typical conversion product distribution profile for an exothermic reaction involving ethylene is as follows:

| Product | Weight Percent |
|---|---|
| C$_5$+ (includes paraffins, olefins, aromatics, naphthenes, etc.) | 73.0 |
| pentanes | 14.8 |
| n-butane | 1.6 |
| isobutane | 4.6 |
| butene | 6.5 |
| propane | 2.5 |
| propylene | 2.3 |
| ethane | 0.6 |
| ethylene | 8.8 |
| methane | 0.1 |

In general, a quantity of ethylene-rich feed should be reacted which will generate an exotherm of sufficient magnitude as to increase the temperature of the catalyst bed in this region to a significant extent, for example, by at least about 50° F., and preferably by at least about 100° F. To accomplish this, from about 0.5 to about 20, and preferably from about 1 to about 10, weight percent of ethylene-rich feed by weight of catalyst present in the stripping zone is usually sufficient. The enhanced capability of the stripping process herein for desorbing sulfur-containing materials from catalyst present in the stripping vessel has the concomitant advantage of reducing SO$_x$ emissions from the regenerator. Ordinarily, then, the temperature of the spent catalyst bed will increase from its usual range of about 880°–1150° F. to about 930°–1250° F. and even higher. This increase in spent catalyst bed temperature significantly enhances the stripping, or desorption, of hydrocarbon materials, and where present, sulfur-containing materials, which are entrained within the catalyst particles. Moreover, in carrying out the improved stripping process herein, it is possible to increase the recovery of such entrained hydrocarbons by from about 5 to about 30 weight percent or more compared to substantially the same stripping procedure carried out in the absence of the aforedescribed exothermic conversion reaction.

Still another advantage of the stripping process of this invention resides in the fact that due to the higher temperature of the spent catalyst as it emerges from the stripping vessel and is introduced into the regenerator, the regeneration operation will be enhanced.

The improved stripping obtained by increasing the temperature of the catalyst bed is shown in FIGS. 3 and 4 where, in a steam stripping operation carried out at a steam to catalyst ratio of 3.5 lb/M lb., the reduction over time (minutes) in the weight percent of entrained hydrocarbon (FIG. 3) and sulfur (FIG. 4) on the spent catalyst is given for increasing levels of catalyst bed temperature.

It is further within the scope of this invention to introduce one or more other highly reactive olefins, e.g., C$_3$ and/or C$_4$ olefin-rich material, into the spent catalyst bed through line 37 in order to take advantage of the high partial pressure of the ethylene-rich feed introduced through line 36 and to further increase the overall productive efficiency of the fluidized catalytic cracking operation (see the conversion product distribution profile above). Amounts of C$_3$ and/or C$_4$ olefin-rich material or other highly reactive olefin ranging from about 0.1 to about 5, and preferably from about 2 to about 3, weight percent of the catalyst present in the stripping zone can advantageously be employed. Hydrocarbon conversion products and stripping gas ascend through the catalyst bed and pass through cyclone separator 40 provided with dipleg 42, the catalyst particles being returned to the catalyst bed and the gasiform products of conversion entering plenum chamber 14 where they are removed by conduit 16 for transfer to a downstream product fractionator (not shown).

Catalyst particles comprising particularly the zeolite Y cracking component attain a relatively high level of hydrocarbonaceous material which is subsequently removed therefrom by regeneration with oxygen-containing regeneration gases. The stripped catalyst particles are passed by conduit 44 to a catalyst regeneration unit represented by regenerator 46 containing a dense fluid bed of mixed catalyst 48. Regeneration gas such a air is introduced to the lower portion of regeneration 46 by air distributor 50 supplied by conduit 52. Cyclone separators 54 provided with diplegs 56 separate entrained catalyst particles from flue gases and return the separated catalyst to the fluid bed of catalyst. Flue gases pass from the cyclones into a plenum chamber and are removed therefrom by conduit 58. Hot regenerated catalyst is returned to the conversion system by conduits 26 and 4 as discussed above.

FIG. 2 describes the stripping section of a single riser fluidized cracking unit provided with means for separating particles of ZSM-5 catalyst from particles of zeolite Y catalyst based primarily upon a difference in the densities of these two types of catalyst components. This capability for separating ZSM-5 catalyst particles from zeolite Y catalyst particles in the stripping vessel makes it possible to have much of the ZSM-5 catalyst bypass the regenerator altogether. As a result, the ZSM-5 catalyst particles can be retained in the catalyst inventory at a higher level of activity therein for a longer average period of time than would be the case were the circulation rate of the ZSM-5 particles the same as or similar to that of the zeolite Y catalyst particles. This, in turn, permits the refiner to take greater advantage of the unique catalytic capabilities of ZSM-5 in a catalytic cracking operation.

Among the techniques which can be used for making one catalyst component more dense than the other is compositing each catalyst with a matrix component of substantially different density. Useful matrix components include the following:

| matrix component | particle density (gm/cm$^3$) |
|---|---|
| alumina | 3.9–4.0 |
| silica | 2.2–2.6 |
| magnesia | 3.6 |
| beryllia | 3.0 |
| barium oxide | 5.7 |
| zirconia | 5.6–5.9 |
| titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator will be significantly more dense than the catalyst requiring frequent regeneration. For example, in the case of a mixed catalyst system containing medium pore and large pore crystalline silicate zeolite and catalysts where it is desired to increase the residency time of the medium pore zeolite catalyst in the riser, the overall packed density of the medium pore zeolite catalyst particles inclusive of its matrix component can advantageously carry from about 0.6 to about 4.0 gm/cm$^3$, and preferably from about 2.0 to about 3.0 gm/cm$^3$, and the overall packed density of the large pore zeolite catalyst particles inclusive of its matrix component can advantageously vary from about 0.4 to about 1.1 gm/cm$^3$ density, and preferably from about 0.6 to about 1.0 gm/cm$^3$.

Another useful technique for adjusting the density of each catalyst component, again in the case of a mixture of medium and large pore zeolite catalysts, is to composite the medium pore zeolite catalyst particles with a material which tends to coke up faster than the particles of large pore zeolite, such resulting in an increase in the density of the former in situ. Illustrative of such materials are hydrated alumina which in situ forms a transition alumina which has a high coking rate. This embodiment possesses several additional advantages. In the coked-up state, the composited medium pore silicate zeolite catalyst is more resistant to attrition which results from collision with other particles in the riser. The individual catalyst particles can sustain more collisions and thus serve as a practical means of adjusting the velocity of the large pore zeolite catalyst particles through the riser (the latter in colliding with the medium pore zeolite catalyst particles will, aa a result, have reduced velocity). In addition, the coked-up composited medium pore zeolite catalyst particles will tend to accumulate metals present in the feed.

As shown in FIG. 2, a mixture of more dense particles of ZSM-5 and less dense particles of zeolite Y are conveyed from cyclone separator unit 14 via dipleg 20 to catalyst bed 22 residing within a vessel 26 provided with a source of stripping gas, e.g., steam, supplied through conduit 27 in the lower section thereof. Vessel 26 occupies an approximately central region of the stripping zone. The more dense particles of ZSM-5 catalyst tend to gravitate toward, and concentrate within, the bottom of vessel 26, and, following stripping, to enter return conduit 28 for cycle to riser 10. Meanwhile, the ascending current of stripping gas and desorbed hydrocarbon material and, where present, sulfur-containing material, acts as a lift medium tending to carry the less dense particles of zeolite Y catalyst out of vessel 26 into an outer peripheral region 40 the lower section of which is provided with its own supply of stripping gas, again, e.g., steam, through conduit 41. Stripping gas and other gasiform material is separated from catalyst particles in cyclone separator 15, the former passing to plenum chamber 16 and the latter entering catalyst bed 22 via dipleg 17. Stripped, spent zeolite Y catalyst continues its downward flow movement and is withdrawn from the stripper through conduit 42 where it is conveyed to a regenerating zone which operates essentially in the manner described above in connection with the process of FIG. 1.

Similarly as in FIG. 1, an ethylene-rich feed can be introduced through line 50 and, optionally, a supplemental feed stream such as C$_3$ and/or C$_4$ olefin can be introduced through line 51, to generate an exotherm which improves the efficiency of the stripping operation in vessel 26. Gasiform products from the riser and the stripping operations in vessel 26 and peripheral region 40 are ultimately conveyed to plenum chamber 16 and from there are conveyed through conduit 18 to a downstream separation facility (not shown).

Having thus provided a general discussion of the present invention and described specific embodiments in support thereof, it is to be understood that no undue restrictions are to be imposed by reason thereof except as provided by the following claims.

What is claimed is:

1. An improved process for stripping, or desorbing, entrained hydrocarbon material and where present, sulfur-containing material, from a catalyst mixture recovered from a catalytic cracking reaction zone which comprises:

(a) providing a quantity of catalyst mixture containing at least one entrained material selected from the group consisting of hydrocarbon material and sulfur-containing material, in at least one stripping zone in which a stripping gas removes said entrained material, wherein the catalyst mixture comprises a first catalyst component and a second catalyst component wherein the first catalyst component includes particles of an amorphous cracking catalyst, a large pore crystalline zeolite cracking catalyst or admixtures thereof, and, wherein the second catalyst component comprises particles of a shape selective medium pore crystalline silicate zeolite catalyst, said particles of first and second catalyst components and, (b) passing ethylene through the stripping zone containing the particles of said shape selective medium pore crystalline silicate zeolite catalyst, thereby conducting an exothermic reaction within the stripping zone continues the second catalyst component, the heat released by the exothermic reaction providing an increase in the temperature of the catalyst in the stripping zone which results in the removal of a greater quantity of entrained material than that occurring in the absence of such exothermic reaction.

2. The process of claim 1 wherein said exothermic reaction is carried out by introducing an ethylene-rich feed in the stripping zone containing particles of second catalyst component downstream of introduction of the stripping gas into the zone, said ethylene-rich feed undergoing exothermic conversion therein to other products.

3. The process of claim 1 wherein the exothermic reaction increases the temperature of the catalyst present within the stripping zone by at least about 50° F.

4. The process of claim 1 wherein the exothermic reaction increases the temperature of the catalyst present within the stripping zone by at least about 100° F.

5. The process of claim 1 wherein the temperature of the catalyst present within the stripping zone is increased as a result of the exothermic reaction from within the range of about 880°–1150° F. to within the range of about 930°–250° F.

6. The process of claim 2 wherein from about 0.5 to about 20 weight percent of ethylene-rich feed by weight of catalyst present in the stripping zone is provided.

7. The process of claim 2 wherein from about 1 to about 10 weight percent of ethylene-rich feed by weight of catalyst present in the stripping zone is provided.

8. The process of claim 1 wherein from about 5 to about 30 weight percent additional hydrocarbon material is removed compared to the same stripping operation carried out in the absence of such exothermic reaction.

9. The process of claim 2 wherein at least one other highly reactive light olefin is introduced in the stripping zone at a level which is above the level of introduction of the ethylene-rich feed therein.

10. The process of claim 9 wherein said highly reactive light olefin is a $C_3$ and/or $C_4$ olefin-rich feed.

11. The process of claim 9 wherein from about 0.1 to about 5 weight percent of highly reactive olefin by weight of catalyst present in the stripping zone is provided.

12. The process of claim 9 wherein from about 2 to about 3 weight percent of highly reactive olefin by weight of catalyst present in the stripping zone is provided.

13. The process of claim 1 wherein the first catalyst component is a large pore crystalline silicate zeolite cracking catalyst.

14. The process of claim 9 wherein the large pore crystalline silicate zeolite cracking catalyst contains at least one member of the group consisting of mordenite, zeolite X, Y, REY, USY and RE-USY and mixtures thereof and the shape selective medium pore crystalline silicate zeolite contains at least one member of the group consisting of ZSM-5, ZSM-11, ZSM-12, ZSM-23, ZSM-35, ZSM-38 and ZSM-48.

15. The process of claim 2 wherein the first catalyst component is a large pore crystalline silicate zeolite cracking catalyst.

16. The process of claim 15 wherein the large pore crystalline silicate zeolite cracking catalyst contains at least one member of the group consisting of mordenite, faujasite, zeolite X, Y, REY, USY and RE-USY and the shape selective medium pore crystalline silicate zeolite contains at least one member of the group consisting of ZSM-5, ZSM-11, ZSM-12, ZSM-23, ZSM-35, ZSM-38 and ZSM-48.

17. The process of claim 9 wherein the first catalyst component is a large pore crystalline silicate zeolite cracking catalyst.

18. The process of claim 17 wherein the large pore crystalline silicate zeolite cracking catalyst contains at least one member of the group consisting of mordenite, faujasite, zeolite X, Y, REY, USY and RE-USY and mixtures thereof and the shape selective medium pore crystalline silicate zeolite contains at least one member of the group consisting of ZSM-5, ZSM-11, ZSM-12, ZSM-23, ZSM-35, ZSM-38 and ZSM-48.

19. The process of claim 10 wherein the first catalyst component is a large pore crystalline silicate zeolite cracking catalyst.

20. The process of claim 19 wherein the large pore crystalline silicate zeolite cracking catalyst contains at least one member of the group consisting of mordenite, zeolite X, Y, REY, USY and RE-USY and the shape selective medium pore crystalline silicate zeolite contains at least one member of the group consisting of ZSM-5, ZSM-11, ZSM-12, ZSM-23, ZSM-35, ZSM-38 and ZSM-48.

* * * * *